United States Patent [19]

Ueno et al.

[11] 4,305,966

[45] Dec. 15, 1981

[54] PROCESS FOR MAKING BACON HAVING ANTIBOTULINAL STABILITY

[75] Inventors: Ryuzo Ueno, Nishinomiya; Toshio Matsuda, Itami; Tatsuo Kanayama, Takarazuka; Yatsuka Fujita, Nishinomiya; Shigeo Inamine, Kobe, all of Japan

[73] Assignee: Kabushiki Kaisha Ueno Seiyaku Oyo Kenkyujo, Osaka, Japan

[21] Appl. No.: 151,804

[22] Filed: May 21, 1980

[30] Foreign Application Priority Data

Sep. 7, 1979 [JP] Japan ............................. 54-114111

[51] Int. Cl.³ .......................... A23B 4/02; A23B 4/12
[52] U.S. Cl. .................................. 426/266; 426/332; 426/335; 426/641; 426/652
[58] Field of Search .............. 426/264, 265, 266, 332, 426/335, 641, 646, 652, 281

[56] References Cited

U.S. PATENT DOCUMENTS

| | | |
|---|---|---|
| 3,099,566 | 7/1963 | Flesch et al. ......................... 426/266 |
| 3,255,022 | 6/1966 | Hinkley et al. ................. 426/652 X |
| 3,386,836 | 6/1968 | Borenstein et al. ............. 426/265 X |
| 3,391,006 | 7/1968 | Sair et al. ............................ 426/266 |
| 3,515,561 | 6/1970 | Flesch et al. ....................... 426/265 |
| 3,595,679 | 7/1971 | Schoch et al. ...................... 426/264 |
| 3,666,488 | 5/1972 | Nakao et al. ....................... 426/266 |

FOREIGN PATENT DOCUMENTS

| | | |
|---|---|---|
| 593599 | 3/1960 | Canada ............................... 426/266 |
| 593601 | 3/1960 | Canada ............................... 426/266 |
| 905744 | 7/1972 | Canada ............................... 426/266 |
| 1098341 | 1/1961 | Fed. Rep. of Germany ...... 426/266 |
| 2713259 | 9/1977 | Fed. Rep. of Germany ...... 426/264 |

OTHER PUBLICATIONS

Ivey et al., *Journal of Food Protection*, vol. 41, No. 8, pp. 621-625, 8-1978.
Hall, "Acid Cure For Meat", *Food Industries*, 11-1935, pp. 533, 426-266.

*Primary Examiner*—Arthur L. Corbin
*Attorney, Agent, or Firm*—Sherman & Shalloway

[57] ABSTRACT

A process for making bacon having antibotulinal stability, comprising adding to pork, which has been cured with a curing agent so as to contain no more than 30 ppm of nitrite radical ($NO_2^-$) and not higher than 0.26% of potassium sorbate based on the weight of meat, an aqueous solution of a water-soluble organic acid and/or inorganic acid, and optionally sodium hexametaphosphate, thereby lowering the average pH of the bacon to approximately 6.0 or below.

7 Claims, No Drawings

PROCESS FOR MAKING BACON HAVING ANTIBOTULINAL STABILITY

This invention relates to a process for making bacon which shows antibotulinal stability, in spite of the substantially lower level of sodium or potassium nitrite added in the course of its preparation.

Normally, from 120 to approximately 156 ppm of sodium nitrite are used, with the conventional commercial bacon, for inhibiting *Clostridium botulinum*, developing favorable color in the meat, and for improving the taste of bacon. The addition of nitrite, however, presents two serious problems to human health as follows. (1) The sliced bacon is normally fried at around 170°–200° C., before it is eaten. Consequently, N-nitro so pyrrolidine is formed in the bacon, in the amount proportionate to the added nitrite radical or that remaining in the bacon, which may amount to as much as several tens of ppm in certain occassions. It is known that N-nitroso pyrolidine is a strong carcinogen. (2) Furthermore, the nitrite radical itself is found to be a carcinogen by Newbern of MIT.

For the above reasons it is desirable that the nitrite should be used at the lowest concentration, preferably zero, in the bacon preparation. It is still more intensely desired that the residual nitrite radical $NO_2^-$ in the bacon should be substantially zero. If no nitrite is used, or if it is used at an extremely low level, however, the bacon loses its antibotulinal stability, and once that bacterium grows therein, it readily produces toxin.

Recently, various methods have been investigated for inhibiting the growth of *C. botulinum* while keeping the nitrite level to the minimum. The most promising of the studied methods is that using concurrently 0.26% of potassium sorbate and 40 ppm of $NaNO_2$ [*Journal of Food Protection*, Vol. 41, No. 8, pages 621–625 (Aug. 1978)], which is said to impart to the bacon approximately equivalent antibotulinal stability to that obtainable with the addition of 120–156 ppm of $NaNO_2$ as has been conventionally practiced. The method, however, still has the drawbacks as follows, and cannot be said quite satisfactory. That is, (1) since approximately equivalent antibotulinal stability to that obtainable with the use of 120–156 ppm of $NaNO_2$ could bearly be expected from the concurrent use of 40 ppm of $NaNO_2$ and 0.26% of potassium sorbate, no further improvement appears possible in reducing the $NaNO_2$ to be added and the residual nitrite radical in the bacon to a minimum. (2) The use of sorbic acid at such a high level as 0.26% incites its volatilization when the bacon is fried, which objectionably irritates the mucous membranes in the eyes, nose and mouth, notably impairing the taste of bacon.

This invention provides a process for solving those problems. According to the present invention, the antibotulinal stability of the treated bacon not only shows no deterioration, but rather improves. Furthermore, the amount of nitrite radical remaining in the bacon can also be reduced. Simultaneously, the amount of sorbic acid can be minimized. This invention is completed, based on the discovery that when an aqueous solution of a water-soluble organic acid and/or an inorganic acid is injected into the meat, which has been cured with known curing agent so as to contain no more than 0.26% of potassium sorbate and 30 ppm of nitrate radical $NO_2^-$ by weight of the meat, and then the meat is smoked, the pH of the bacon can be lowered to 6.0 or below, without substantially degrading the bacon quality.

When an aqueous solution of a water-soluble organic acid and/or inorganic acid is injected into a thoroughly cured meat lump, in an attempt to lower pH of the latter, surprisingly the water-retaining property of the meat shows little lowering in spite of the pH drop. This is probably due to the fact that salted meat becomes to a certain degree resistant to pH drop.

The lowering of pH bacon brings about conspicuous advantages as follows. (1) Such a low pH as 6.0 or below notably increases the effect of sorbic acid against *C. botulinum*. The antibacterial activity of sorbic acid is derived from its non-dissociative molecules. As the pH is lowered, the ratio of its non-dissociative molecules increases exponentially in the vicinity of specified pH value. It is therefore extremely useful to lower the pH, for causing the sorbic acid to exhibit its maximum effect. Consequently, the amount of sorbic acid to be added to bacon can be reduced at the lower pH, to make its irritation of mucous membrane less, when the bacon is fried. (2) The nitrite radical remaining in the bacon becomes less as the pH is lowered. Consequently, the amount of N-nitro so pyrrolidine formed when the bacon is fried can also be reduced. (3) The lower pH is inadequate for the growth of *C. botulinum*. This means that the bacon prepared by the present invention exhibits stronger antibotulinal stability.

The lowered pH of bacon thus produces substantial merit. It is difficult to lower the pH to 6.0 or below by the conventional methods, such as that of dissolving 120–156 ppm of nitrite in the pickle solution of bacon, or that of using concurrently 0.26% of potassium sorbate and 40 ppm of sodium nitrite, because the pickle solution must always be kept at alkaline pH. If the solution becomes acidic, the nitrite radicals ($NO_2^-$) therein are converted to NO gas and scattered, and it loses its effect as a pickle solution. If an acidic pickle solution is used to start with, the water-retaining ability of the meat is reduced. Consequently the bacon becomes hard and heterogeneous in quality. Furthermore, the water contained in the meat largely evaporates off during the smoking to increase the weight loss, very disadvantageously decreasing the yield. For these reasons, it is extremely difficult to lower pH of the bacon to 6.0 or below in the conventional processes.

According to the process of this invention, the antibotulinal stability can be further increased by injecting into the cured meat lumps, hexametaphosphate which is an acidic phosphate, together with the aqueous acid solution. No such antibotulinal stability increasing effect of, for example, sodium hexametaphosphate, is observed with other polyphosphates, for example, sodium pyrophosphate, acid sodium pyrophoshate or sodium tripolyphosphate. This effect is clearly recognizable only with sodium hexametaphosphate, which is first found by the present inventors. Again according to our researches, other phosphates, for example, acid sodium pyrophosphate, show the action to inhibit the color development of bacon promoted by the nitrite, thus adversely affecting the quality of bacon.

In a preferred embodiment of this invention, the meat lumps are cured with an ordinarily used pickle solution containing nitrite radicals ($NO_2^-$) at concentrations not higher than 30 ppm (corresponds to 45 ppm of $NaNO_2$) by weight of the meat (such as table salt, ascorbate or erythorbate, containing if necessary a polyphosphate, sugars and the like). Then an aqueous solution of a water-soluble organic acid and/or inorganic acid is injected into the meat, which is subsequently smoked to be converted to bacon.

In the present invention, the nitrite radical level is specified to be not higher than 30 ppm, because such is sufficient for imparting the desired color and taste to the meat, and with which the residual nitrite radical in the bacon becomes substantially zero, by the time the bacon is sold to the consumers through stores so long as the bacon is made under conditions of a pH value of 6.0 or less. Thus the addition of not higher than 30 ppm of nitrite radical in reality presents no health problem to the consumers.

Examples of the water-soluble organic acids to be used in the process of the invention include acetic acid, propionic acid, lactic acid, malic acid, succinic acid, tartaric acid, adipic acid, fumalic acid, citric acid and gluconodelta-lactone (GDL), and an example of the inorganic acid is phosphoric acid.

In an aqueous solution of the water-soluble organic acid and/or inorganic acid, the concentration of the acidic substance or substances should be in the range of 1–5% by weight. The amount of injection of the aqueous solution should be 2–10% by weight of the meat, and 0.05–0.15% by weight as the acidic substance or substances. With the injection as above, pH of bacon can be lowered by approximately 0.2–0.4. Because the conventional commercial bacon has the pH of 6.2–6.3, the specified addition of the acidic substance or substances can lower its pH to 6.0 or below, thus fully accomplishing the intended effect. The pH-lowering in this order can considerably enhance the effect of sorbic acid. For instance comparing the cases wherein the pH's are 6.5 and 6.0, respectively, the concentration of non-dissociative molecules of sorbic acid under the pH of 6.0 is approximately double that under the pH of 6.5. Theoretically this means a doubled effect of sorbic acid. Thus, even a minor pH lowering such as by around 0.1 shows a substantial merit.

As already mentioned, in order for rendering the imparted antibotulinal stability still more effective, an aqueous solution of sodium hexametaphosphate is added to the cured meat. The preferred concentration of sodium hexametaphosphate is normally 0.2–0.5% based on the weight of meat. The phosphate is itself weakly acidic, and can lower the pH of the product, although slightly. It is recommended that the sodium hexametaphosphate should be dissolved in the aforesaid aqueous solution of acidic substance or substances, though it is permissible to add it as a separate aqueous solution. Obviously, it is added at the time the aqueous acid solution is injected, i.e., after the meat is cured. Whereby the growth of C. botulinum and toxin formation can be very effectively inhibited.

The advantages of this invention over the conventional methods can be summarized as follows:

1. It is possible to lower the pH of bacon to 6.0 or below while maintaining favorable conditions for the quality and color development of bacon, by lowering the pH, not during the salting, but gradually during the smoking.

2. Because of the low pH attained, the residual nitrite radical level is extremely low compared with that in the process concurrently using 0.26% of potassium sorbate and 40 ppm of a nitrite, not to mention that in the conventional method adding 120–156 ppm of a nitrite.

3. The antibotulinal stability is improved, and consequently it is made possible to reduce the required amount of sorbic acid which impairs the taste of bacon.

4. As a whole, the antibotulinal stability of the bacon is improved over that of the product of conventional process adding 120–156 ppm of a nitrite.

Hereinafter the subject process will be more specifically explained with reference to the working examples, in which the percents are by weight.

EXAMPLE 1

In this Example the invention is compared with the conventional method.

Preparation of bacon

As the starting material, ordinary pork belly was used. As the basic pickle solution, that containing 15% of table salt, 2.5% of sodium tripolyphosphate, and 0.55% of sodium erythorbate was used. Additionally, sodium nitrite and potassium sorbate were dissolved in the pickle solution, in the amounts varied for each test group, as specified in the later appearing Table 1. The curing was effected by injecting approximately 10% by weight of the meat of the pickle solution into the meat, and storing the meat in a refrigerator for a day. Also a glucono-delta-lactone is used as acid, which was dissolved in water and injected into the meat by approximately 5% (secondary injection). Since the secondary injection of the aqueous acid solution increases the water content of the meat, a corresponding quantity of water alone was injected into the meat used in the control groups (Test Groups 1 and 2 in Table 1).

After the secondary injection the meat lumps were smoked according to the conventional practice (the inside temperature of the meat being 53° C.). Then the products were cooled and sliced. Sampling the slices at random, various tests were carried out as follows.

pH Measurement

After blending 10 g of a sample with 50 ml of water, its pH was measured with a glass electrode pH meter.

Determination of water content

Five (5) g of each sample was dried at 105° C. for 20 hours, and the resulting weight loss was made the water content.

Sensory Test

The sliced bacon was fried in a Teflon (polytetrafluoroethylene) coated pan at medium temperatures, and transferred into a covered vessel. The testers first examined the smell and color of the fried bacon and then ate the slices for functional evaluation. The results were expressed in five grades, the most appealing being graded 5, and the entirely unacceptable, graded 1. A panel of ten testers participated in the sensory test, and the average of their gradings was adopted.

Antibotulinal test

Two (2) kg of the sliced bacon was inoculated with A-type and B-type C. botulinum spores. The inoculation was effected by the method of Christiansen et al. using sterilized sand as the carrier of the spores (*Appl. Microbiol.* 27, 733–737, 1974) at the ratio of 1000 spores /g. Approximately 150 g each of thus inoculated bacon was vacuum-packed and stored at 30° C. The state of expansion of the packages during the storage was observed. Incidentally, ten samples were used in each test group.

Test results

The results are as shown in Table 1, from which it may be understood that the test group, of which the pH was lowered by the injection of glucono-delta-lactone (GCL), showed greater antibotulinal stability, and that when the pH was lowered by the secondary injection of the acid, the substantially detrimental effect of pH drop on the quality of bacon could be prevented.

TABLE 1

| Test Group | Added Chemical: Salting liquid | Added Chemical: Secondary injection | Water content (%) | pH | Sensory test | Number of days passed before first expansion started |
|---|---|---|---|---|---|---|
| 1 | $NaNO_2$ 156 ppm | — | 35.2 | 6.19 | 4.4 | 32 |
| 2 | SoK 0.26%<br>$NaNO_2$ 40 ppm | — | 36.0 | 6.21 | 3.9 | 30 |
| 3 | SoK 0.26%<br>$NaNO_2$ 40 ppm* | GDL 0.03% | 35.8 | 5.92 | 4.3 | 43 |
| 4 | SoK 0.19%<br>$NaNO_2$ 40 ppm | GDL 0.3% | 35.3 | 5.90 | 4.3 | 38 |
| 5 | SoK 0.13%<br>$NaNO_2$ 40 ppm | GDL 0.3% | 35.6 | 5.89 | 4.5 | 31 |

SoK: potassium sorbate
*: Forty (40) ppm of $NaNO_2$ corresponds to 26.7 ppm of nitrite radical ($NO_2^-$).

EXAMPLE 2

The effect of said injection and sodium hexametaphosphate injection against *C. botulinum* was examined in this Example. The preparation of bacon, measurement of pH and water content, sensory test and the antibotulinal test were performed in the identical matter with those in Example 1.

The results are as shown in Table 2. It is clearly demonstrated that the injections of the acid and sodium hexametaphosphate increase the antibotulinal stability of the bacon, without any qualitative degradation normally observed with the pH drop by the conventional methods. In order to obtain an equivalent level of antibotulinal stability this invention uses lesser amounts of potassium sorbate and $NaNO_2$ compared with the conventional methods. The injection of acid sodium pyrophosphate failed to increase the antibotulinal stability of bacon as accomplished by the sodium hexametaphosphate, and was apt to degrade the bacon quality, particularly the color development.

TABLE 2

| Test group | Added Chemical: Salting liquid | Added Chemical: Secondary injection | Water content (%) | pH | Sensory test | Number of days passed before first expansion started |
|---|---|---|---|---|---|---|
| 1 | $NaNO_2$ 156 ppm | — | 34.5 | 6.15 | 4.6 | 29 |
| 2 | Sok 0.26%<br>$NaNO_2$ 40 ppm | — | 35.0 | 6.18 | 4.4 | 30 |
| 3 | Sok 0.26%<br>$NaNO_2$ 40 ppm | citric acid 0.1% | 35.2 | 5.92 | 4.3 | 39 |
| 4 | Sok 0.26%<br>$NaNO_2$ 40 ppm | citric acid 0.1%<br>NaHMP 0.5% | 34.8 | 5.90 | 4.3 | 45 |
| 5 | Sok 0.13%<br>$NaNO_2$ 20 ppm | citric acid 0.1% | 35.5 | 5.93 | 4.5 | 29 |
| 6 | Sok 0.13%<br>$NaNO_2$ 20 ppm | citric acid 0.1%<br>NaHMP 0.5% | 34.6 | 5.91 | 4.5 | 31 |
| 7 | Sok 0.13%<br>$NaNO_2$ 20 ppm | citric acid 0.1%<br>NaAPP 0.5% | 35.0 | 5.92 | 4.1 | 30 |

Sok: potassium sorbate
NaHMP: sodium hexametaphosphate
NaAPP: acid sodium pyrophosphate
Note:
The pickle solution containing no sodium tripolyphosphate was used in the test groups, Nos. 4, 6 and 7.

We claim:

1. A process for making bacon, having antibotulinal stability, from lumps of pork, comprising adding to pork, which has been cured with a nitrite and potassium sorbate containing curing agent so as to contain no more than 30 ppm of nitrite radical ($NO_2^-$) and not higher than 0.26% of potassium sorbate based on the weight of pork, an aqueous solution of a water-soluble organic acid and/or inorganic acid, thereby lowering the average pH of the bacon to approximately 6.0 or below.

2. The process of claim 1 wherein the aqueous solution is an aqueous solution of glucono-delta-lactone.

3. The process of claim 1 wherein the aqueous solution is an aqueous solution of citric acid.

4. A process for making bacon, having antibotulinal stability, from lumps of pork, comprising adding to pork, which has been cured with a nitrite and potassium sorbate containing curing agent so as to contain no more than 30 ppm of nitrite radical ($NO_2^-$) and not more than 0.26% of potassium sorbate based on the weight of the pork, sodium hexametaphosphate and an aqueous solution of a water-soluble organic acid and/or, inorganic acid, thereby lowering the average pH of the bacon to approximately 6.0 or below.

5. The process of claims 1 or 4 wherein the organic acid is selected from the group consisting of acetic acid, propionic acid, lactic acid, malic acid, succinic acid, tartaric acid, adipic acid, fumaric acid, citric acid and glucono-delta-lactone, and the inorganic acid is phosphoric acid.

6. The process of claim 5 wherein from about 0.05–0.15% by weight, based on the weight of the meat, of the water-soluble organic acid and/or inorganic acid is added to the pork.

7. The process according to claim 4 wherein the amount of sodium hexametaphosphate is in the range of 0.2–0.5%, based on the weight of the pork.

* * * * *